United States Patent
Smirnov et al.

(10) Patent No.: US 8,046,906 B2
(45) Date of Patent: Nov. 1, 2011

(54) JIG FOR ASSEMBLING ROTOR

(75) Inventors: Viatcheslav Smirnov, Gyunggi-do (KR); Pyo Kim, Gyunggi-do (KR); Nam Seok Kim, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 197 days.

(21) Appl. No.: 12/457,940

(22) Filed: Jun. 25, 2009

(65) Prior Publication Data

US 2009/0271975 A1   Nov. 5, 2009

Related U.S. Application Data

(62) Division of application No. 11/785,765, filed on Apr. 19, 2007, now Pat. No. 7,562,438.

(30) Foreign Application Priority Data

Apr. 20, 2006   (KR) .................. 10-2006-0035828

(51) Int. Cl.
   *B23P 19/00*   (2006.01)
(52) U.S. Cl. .................. 29/732; 29/735; 29/596
(58) Field of Classification Search ............ 29/596–598, 29/732–736, 760; 310/254.42; 242/432.2–432.4
   See application file for complete search history.

(56) References Cited

U.S. PATENT DOCUMENTS

| | | | |
|---|---|---|---|
| 4,574,046 A * | 3/1986 | Sprow | 209/44 |
| 5,357,163 A | 10/1994 | Minakuchi et al. | |
| 5,495,660 A | 3/1996 | Choi | |
| 5,758,408 A | 6/1998 | Choi | |
| 5,901,801 A | 5/1999 | Toida et al. | |
| 6,170,146 B1 | 1/2001 | Katagiri et al. | |
| 6,199,265 B1 * | 3/2001 | Itou et al. | 29/596 |
| 6,205,644 B1 * | 3/2001 | Daniels et al. | 29/596 |
| 6,739,034 B2 | 5/2004 | Suzuki et al. | |
| 7,009,817 B2 | 3/2006 | Sawai et al. | |
| 7,088,023 B1 | 8/2006 | Gomyo et al. | |
| 7,293,350 B2 | 11/2007 | Sawada | |
| 7,562,438 B2 * | 7/2009 | Smirnov et al. | 29/732 |

FOREIGN PATENT DOCUMENTS

| | | |
|---|---|---|
| JP | 10-145997 | 5/1998 |
| JP | 2001-287124 | 10/2001 |
| JP | 2004-139650 | 5/2004 |

(Continued)

OTHER PUBLICATIONS

Office Action mailed on Jul. 24, 2008 in parent application, U.S. Appl. No. 11/785,765.

(Continued)

*Primary Examiner* — Minh Trinh

(57) ABSTRACT

The jig includes an upper jig part, a lower jig part, a support plate, a guide jig part, and a spring. The upper jig part has a pressure protrusion for press-fitting a rotating shaft, and applies pressing force to the rotating shaft. The lower jig part supports a rotor casing in a direction which is opposite the acting direction of the pressing force. The support plate is mounted to the lower jig part, and supports the rotor casing in a direction which is opposite that of the force for press-fitting the rotating shaft. The guide jig part supports the rotor casing in a direction which is opposite that of reaction force generated in the rotor casing by the support plate. The spring elastically biases the guide jig part towards the rotor casing.

4 Claims, 4 Drawing Sheets

FOREIGN PATENT DOCUMENTS

JP          2005-218288        8/2005

OTHER PUBLICATIONS

Office Action mailed on Jan. 2, 2009 in parent application, U.S. Appl. No. 11/785,765.

U.S. Appl. No. 11/785,765, filed Apr. 19, 2007, Viatcheslav Smirnov, Samsung Electronics Co., Ltd.

Japanese Office Action dated Jul. 5, 2010, issued in corresponding Japanese Patent Application.

1 U.S. Notice of Allowance dated Mar. 20, 2009, issued in the file history of U.S. Appl. No. 11/785,765.

\* cited by examiner

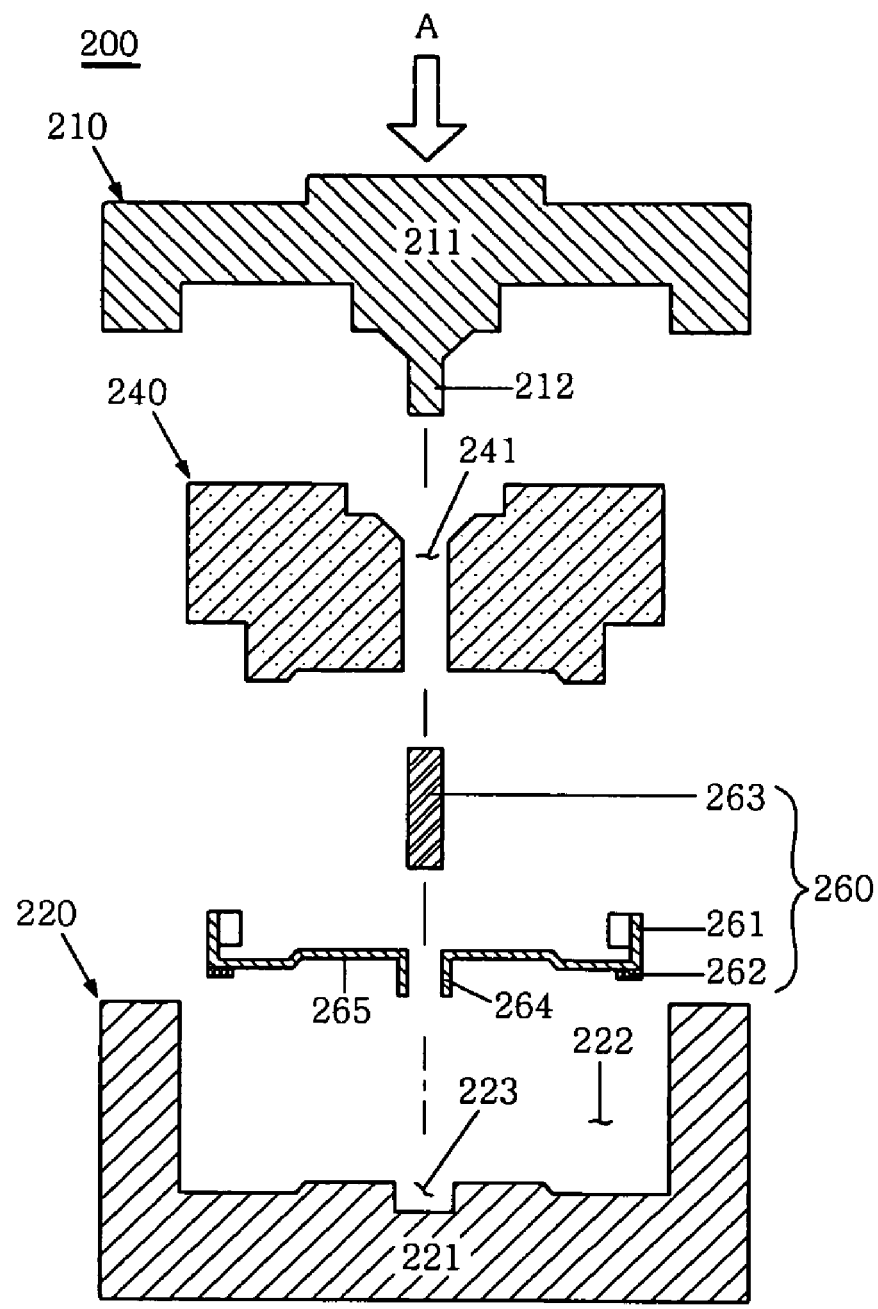
FIG.3 – Prior Art

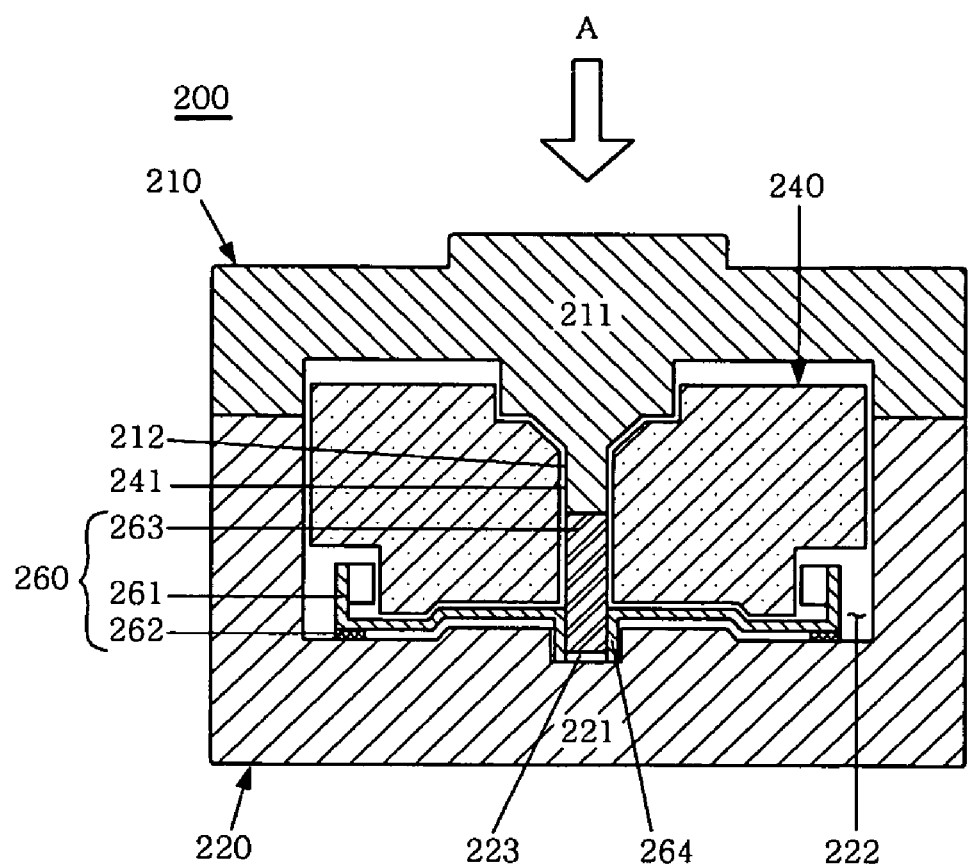
FIG. 4 – Prior Art

JIG FOR ASSEMBLING ROTOR

CROSS-REFERENCE TO RELATED APPLICATIONS

This application is a U.S. divisional application filed under 35 USC 1.53(b) claiming benefit of U.S. Ser. No. 11/785,765 filed in the United States on Apr. 19, 2007 now U.S. Pat. No. 7,562,438, which claims earlier benefit to Korean Patent Application No. 10-2006-0035828, filed with the Korean Intellectual Property Office on Apr. 20, 2006, the disclosure of which is incorporated herein by reference in its entirety.

BACKGROUND OF THE INVENTION

1. Field of the Invention

The present invention relates generally to a jig for assembling a rotor and, more particularly, to a jig for assembling a rotor, which is capable of preventing a rotor casing from being deformed when a rotating shaft is press-fitted into the rotor casing.

2. Description of the Related Art

A rotor is a part that is used in a spindle motor installed in a hard disk drive or a CD drive. The rotor includes a rotor casing and a rotating shaft, which supports the rotor casing. A rubber ring is mounted to the rotor casing to prevent the slippage of a recording medium.

The rotor of the spindle motor is assembled such that the rotating shaft is press-fitted into the rotor casing using a jig to which a pressing force is applied. One example of the jig for assembling the rotor is schematically shown in FIGS. 3 and 4.

As shown in FIGS. 3 and 4, a conventional rotor assembly jig 200 includes an upper jig part 210, a lower jig part 220, and a guide jig part 240. A rotor 260 includes a rotor casing 261, a rubber ring 262, and a rotating shaft 263.

The upper jig part 210 functions to apply pressing force to the rotating shaft 263, and includes a plate-shaped body 211 and a pressure protrusion 212 for pressing the rotating shaft 263. At least part of the pressure protrusion 212 is inserted into the guide jig part 240 and directly presses the rotating shaft 263.

The lower jig part 220 functions to support the rotor casing 261, and includes a plate-shaped body 221 and a cavity 222 for receiving the rotor casing 261. The bottom of the cavity 222 is stepped to correspond to the rotor casing 261. A holder seat 223 is formed in the body 221 for insertion of a holder 264 of the rotor casing 261 into the holder seat 223.

The guide jig part 240 functions to guide the pressed rotating shaft 263 into the rotor casing 261, and has a through hole 241 which is open toward the holder 264 of the rotor casing 261.

As shown in FIG. 4, the rotating shaft 263 is press-fitted into the rotor casing 261 by pressing force.

First, the rotor casing 261 is seated in the cavity 222 of the lower jig part 220, and the guide jig part 240 is placed above the rotor casing 261.

Next, the rotating shaft 263 is inserted into the through hole 241 to be guided to the holder 264, and is press-fitted into the holder 264 by the pressure protrusion 212 of the upper jig part 210. At this time, the upper jig part 210 presses the rotating shaft 263 in the direction shown by arrow A due to the pressing force. When the lower surface of the upper jig part 210 meets the upper surface of the lower jig part 220, the insertion of the rotating shaft 263 is completed.

However, since a surface 265 of the rotor casing 261 having no rubber ring is not supported by the lower jig part 220, the rotor casing 261 is bent in the direction A where pressing force is applied, and is thus deformed when the rotating shaft 263 is press-fitted into the rotor casing 261.

SUMMARY OF THE INVENTION

Accordingly, the present invention has been made keeping in mind the above problem occurring in the prior art, and an object of the present invention is to provide a jig for assembling a rotor, which has a support plate to support a surface of a rotor casing having no rubber ring in a direction opposite that of the pressing force of a rotating shaft, and presses the rotor casing in a direction opposite that of the reaction force generated by the support plate, thus preventing the rotor casing from being damaged.

In order to accomplish the above object, the present invention provides a jig for assembling a rotor, including a first support member for supporting a rotor casing in a direction opposite a direction in which force pressing a rotating shaft acts, and a second support member for supporting a rotor casing in a direction opposite an acting direction of reaction force which is generated in the rotor casing by the first support member.

At least one of the first and second support members has elasticity.

Further, the first support member is made of the same material as a rubber ring mounted to the rotor casing to prevent the slippage of a recording medium, and has the same thickness as the rubber ring.

The first support member supports a surface of the rotor casing having no rubber ring.

The second support member supports the rotor casing at a position corresponding to the first support member.

The present invention provides a jig for assembling a rotor, including a support plate for supporting a rotor casing in a direction opposite a direction in which force pressing a rotating shaft acts, a guide jig part for supporting a rotor casing in a direction opposite an acting direction of reaction force which is generated in the rotor casing by the support plate, and a spring for elastically biasing the guide jig part towards the rotor casing.

The support plate has elasticity.

Further, the support plate is made of the same material as a rubber ring mounted to the rotor casing to prevent the slippage of a recording medium, and has the same thickness as the rubber ring.

Further, the support plate supports a surface of the rotor casing having no rubber ring.

The guide jig part supports the rotor casing at a position corresponding to the support plate.

The guide jig part has a through hole so as to guide the rotating shaft into the rotor casing.

The jig further includes a upper jig part which applies the pressing force to the rotating shaft and has a pressure protrusion. At least part of the pressure protrusion is inserted into the through hole to press the rotating shaft.

Further, the upper jig part supports one end of the spring.

The jig further includes a lower jig part for supporting the support plate in a direction opposite an acting direction of the pressing force, the lower jig part having a cavity so as to receive the guide jig part and the rotor casing.

In this case, the cavity has a bottom surface on which the support plate is mounted.

BRIEF DESCRIPTION OF THE DRAWINGS

The above and other objects, features and advantages of the present invention will be more clearly understood from the following detailed description taken in conjunction with the accompanying drawings, in which:

FIG. 3 is an exploded perspective view showing a conventional jig for assembling a rotor; and FIG. 4 is a schematic view showing the rotor assembly jig of FIG. 3.

DETAILED DESCRIPTION OF THE PREFERRED EMBODIMENTS

Hereinafter, a jig for assembling a rotor according to the preferred embodiment of the present invention will be described in detail with reference to the accompanying drawings.

Figure 1:
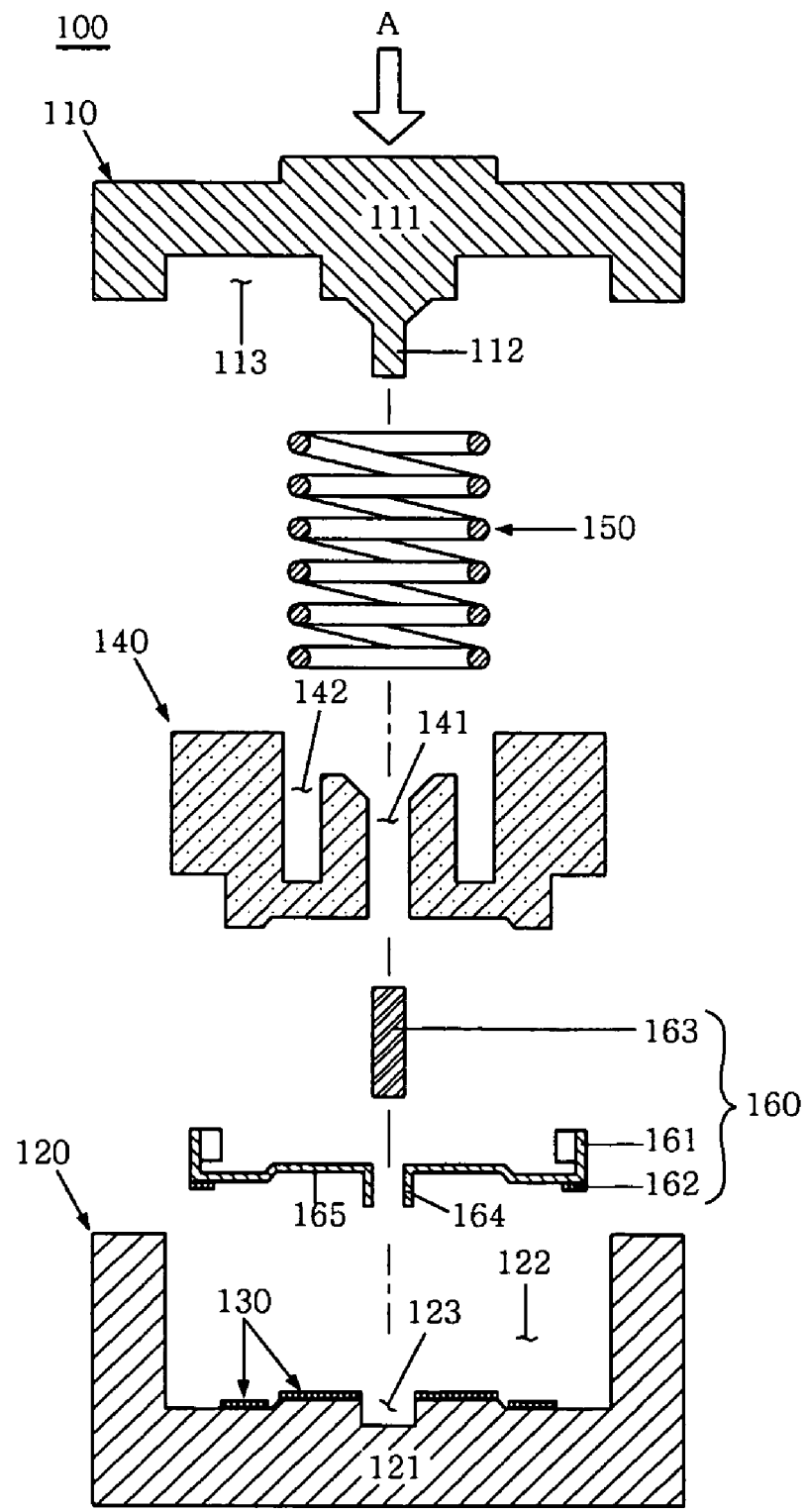
FIG. 1 is an exploded perspective view showing a jig for assembling a rotor, according to the preferred embodiment of the present invention.
Figure 2:
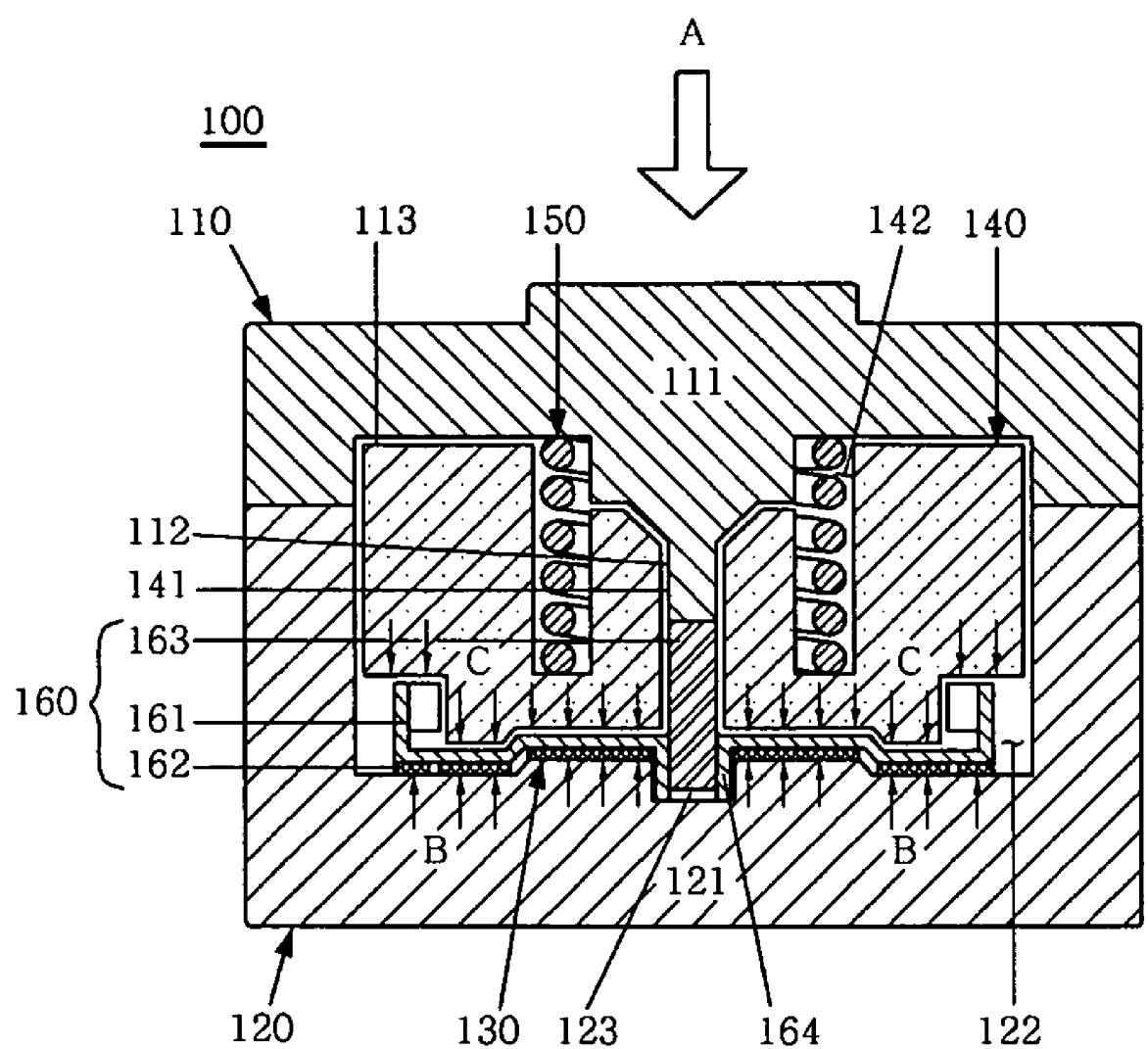
FIG. 2 is a schematic view showing the rotor assembly jig of FIG. 1.

As shown in FIGS. 1 and 2, a rotor assembly jig 100 according to the preferred embodiment of the present invention includes an upper jig part 110, a lower jig part 120, support plates 130, a guide jig part 140, and a spring 150. A rotor 160 includes a rotor casing 161, a rubber ring 162, and a rotating shaft 163.

The upper jig part 110 functions to apply pressing force A to the rotating shaft 163, and includes a plate-shaped body 111 and a pressure protrusion 112 for pressing the rotating shaft 163.

The body 111 has an annular cavity 113 which receives at least an upper part of the guide jig part 140. An end of the spring 150 is supported on the bottom surface of the annular cavity 113, so that the guide jig part 140 is biased towards the rotor casing 161. Preferably, the bottom surface of the cavity 113 is not in contact with the upper end of the guide jig part 140, so that the guide jig part 140 is pressed only by the spring 150.

The pressure protrusion 112 extends from the central portion of the body 111 to the rotor casing 161. At least part of the pressure protrusion 112 is inserted into the guide jig part 140, by which the rotating shaft 163 is press-fitted into the rotor casing 161. Here, the pressure protrusion 112 directly applies the pressing force of the upper jig part 110 to the rotating shaft 163.

The lower jig part 120 functions to support the rotor casing 161, and includes a plate-shaped body 121, with a cavity 122 defined in the center of the body 121.

The cavity 122 receives the rotor casing 161. The bottom surface of the cavity 122 is stepped to correspond to the rotor casing 161. Further, a holder seat 123 is formed in the bottom surface of the cavity 122 so that a holder 164 of the rotor casing 161 is inserted into the holder seat 123.

Further, the rotor casing 161 seated in the cavity 122 is spaced apart from the bottom surface of the cavity 122 by a distance corresponding to the thickness of the rubber ring 162 which prevents the slippage of a recording medium.

The support plates 130 function to support the rotor casing 161 in the direction B which is opposite the direction A in which the force pressing the rotating shaft 163 acts. More concretely, the support plates 130 supports a surface 165 of the rotor casing 163 having no rubber ring. Preferably, the support plates 130 are made of the same material as the rubber ring 162, so that they have elasticity, and have the same thickness as the rubber ring 162.

According to this embodiment, the surface 165 having no rubber ring can be supported by two support plates 130 in two gaps defined between the rotor casing 161 and the cavity 122.

Further, the support plates 130 may be secured to the bottom surface of the cavity 122. It is preferable that the support plates 130 be attached to the cavity 122 using an adhesive.

Here, when the rotating shaft 163 is press-fitted, reaction force is generated by the support plates 130 in the direction B opposite that of the pressing force A acting on the rotor casing 161. However, the reaction force can be overcome by the guide jig part 140 and the spring 150.

The guide jig part 140 functions to support the rotor casing 161 in the direction C which is opposite the acting direction of the reaction force B, which is generated in the rotor casing 161. More concretely, the guide jig part 140 supports the rotor casing 161 at a position corresponding to the support plates 130. A through hole 141 is formed in the central portion of the guide jig part 140.

The through hole 141 is open toward the holder 164 of the rotor casing 161, thus guiding the rotating shaft 163 into the holder 164.

Further, the lower surface of the guide jig part 140 supporting the rotor casing 161 is stepped to correspond to the rotor casing 161, so that the guide jig part 140 supports the entire surface of the rotor casing 161.

A mounting recess 142 is formed in the guide jig part 140 such that the spring 150 is mounted in the mounting recess 142. The mounting recess 142 is open toward the upper jig part 110 so that one end of the spring 150 contacts the upper jig part 110.

The spring 150 functions to elastically bias the guide jig part 140 towards the rotor casing 161, and is inserted into the mounting recess 142 of the guide jig part 140. The lower end of the spring 150 is supported by the bottom of the mounting recess 142, while the upper end of the spring 150 is supported by the upper jig part 110.

The process of pressing the rotating shaft 163 into the rotor casing 161 using the jig 100, which is constructed as described above, will be described with reference to FIG. 2.

As shown in FIG. 2, the rotating shaft 163 is press-fitted into the rotor casing 161 by the pressing force.

First, the rotor casing 161 is seated in the cavity 122 of the lower jig part 120. At this time, the holder 164 of the rotor casing 161 is inserted into the holder seat 123, and the surface 165 of the rotor casing 161 having no rubber ring which is slightly spaced apart from the bottom surface of the cavity 122 due to the rubber ring 162 is supported by the support plates 130 which are attached to the lower jig part 120.

Next, the guide jig part 140, in which the spring 150 is installed, is placed above the rotor casing 161. At this time, the through hole 141 of the guide jig part 140 is precisely aligned with the holder 164, and the lower surface of the guide jig part 140 supports the entire rotor casing 161.

Subsequently, the rotating shaft 163 is inserted into the through hole 141 of the guide jig part 140, and is guided into the holder 164.

Thereafter, the upper jig part 110 is placed above the guide jig part 140. When the pressing force A is applied to the upper jig part 110, the pressure protrusion 112 presses the rotating shaft 163, so that the rotating shaft 163 is press-fitted into the holder 164. At this time, the upper jig part 110 contacts the spring 150 and presses the guide jig part 140 in the direction shown by the arrow C, thus offsetting a reaction force which is generated in the rotor casing 161 by the support plates 130 and the rubber ring 162. Further, when the lower surface of the upper jig part 110 meets the upper surface of the lower jig part 120, the insertion of the rotating shaft 163 has been completed.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

As described above, the present invention provides a jig for assembling a rotor, in which a support plate supports a surface of a rotor casing having no rubber ring, and a guide jig part equipped with a spring presses the rotor casing at a position corresponding to the support plate, thus preventing the rotor casing from being deformed when the rotating shaft is press-fitted into the rotor casing.

What is claimed is:

1. A jig for assembling a rotor including a lower jig locating a rotor casing in its upper part and an upper jig to pressurize the rotating shaft to press-fit the rotating shaft to the rotor casing, comprising:

a support plate located at the upper part of the lower jig opposite to the rotor casing to support the rotor casing in a direction opposite a direction in which force pressing the rotating shaft acts; and a guide jig pressurized by the upper jig to support a rotor casing in a direction opposite an acting direction of reaction force which is generated in the rotor casing by the support plate, wherein the support plate is made of the same material as a rubber ring mounted to the rotor casing to prevent the slippage of a recording medium, and has the same thickness as the rubber ring, the support plate supporting a surface of the rotor casing having no rubber ring.

2. The jig as set forth in claim 1, wherein the guide jig supports the rotor casing at a position corresponding to the support plate.

3. The jig as set forth in claim 1, wherein at least one of the support plate and guide jig has elasticity.

4. The jig as set forth in claim 3, wherein the guide jig ports the rotor casing at a position corresponding to the support plate.

* * * * *

UNITED STATES PATENT AND TRADEMARK OFFICE
CERTIFICATE OF CORRECTION

| | | |
|---|---|---|
| PATENT NO. | : 8,046,906 B2 | Page 1 of 1 |
| APPLICATION NO. | : 12/457940 | |
| DATED | : November 1, 2011 | |
| INVENTOR(S) | : Viatcheslav Smirnov et al. | |

It is certified that error appears in the above-identified patent and that said Letters Patent is hereby corrected as shown below:

IN THE CLAIMS:
Column 6, Line 15, In Claim 4, delete "ports" and insert --supports--, therefor.

Signed and Sealed this
Thirty-first Day of January, 2012

David J. Kappos
*Director of the United States Patent and Trademark Office*